(12) United States Patent
Kainz et al.

(10) Patent No.: US 7,441,230 B2
(45) Date of Patent: Oct. 21, 2008

(54) METHOD OF UTILIZING PRODUCT PROXIES WITH A DEPENDENCY GRAPH

(75) Inventors: Florian Kainz, San Rafael, CA (US); Charles Allen Kilpatrick, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 412 days.

(21) Appl. No.: 11/245,642

(22) Filed: Oct. 7, 2005

(65) Prior Publication Data

US 2007/0080964 A1 Apr. 12, 2007

(51) Int. Cl.
G06F 9/44 (2006.01)
(52) U.S. Cl. .................................. 717/105; 345/440
(58) Field of Classification Search ............... None
See application file for complete search history.

(56) References Cited

U.S. PATENT DOCUMENTS

| | | | | |
|---|---|---|---|---|
| 5,402,532 A | * | 3/1995 | Epstein et al. | 345/422 |
| 5,561,747 A | * | 10/1996 | Crocker et al. | 345/419 |
| 5,689,711 A | * | 11/1997 | Bardasz et al. | 717/105 |
| 5,799,305 A | * | 8/1998 | Bortvedt et al. | 707/10 |
| 6,154,215 A | * | 11/2000 | Hopcroft et al. | 345/418 |
| 6,597,363 B1 | * | 7/2003 | Duluk et al. | 345/506 |
| 7,030,760 B1 | * | 4/2006 | Brown | 340/568.1 |
| 7,050,955 B1 | * | 5/2006 | Carmel et al. | 703/6 |
| 7,240,364 B1 | * | 7/2007 | Branscomb et al. | 726/9 |
| 7,265,756 B2 | * | 9/2007 | Schneider et al. | 345/440 |
| 2002/0032697 A1 | * | 3/2002 | French et al. | 707/500.1 |
| 2003/0001877 A1 | * | 1/2003 | Duquesnois | 345/716 |
| 2006/0206872 A1 | * | 9/2006 | Krishnaswamy | 717/133 |
| 2006/0259448 A1 | * | 11/2006 | Yeo et al. | 707/1 |

* cited by examiner

*Primary Examiner*—Mark Zimmerman
*Assistant Examiner*—David Chu
(74) *Attorney, Agent, or Firm*—Fish & Richardson P.C.

(57) ABSTRACT

Changes to the outputs of a dependency graph, which has attribute nodes and operator nodes, are detected by forming product proxies for the outputs of dependency graph nodes. The product proxies can be formed by entering information about the dependency graph into a hashing algorithm. Before and after product proxies are then used to determine if the outputs have changed.

20 Claims, 4 Drawing Sheets

METHOD OF UTILIZING PRODUCT PROXIES WITH A DEPENDENCY GRAPH

BACKGROUND OF THE INVENTION

1. Field of the Invention

The present invention relates to computations represented by dependency graphs and, more particularly, to a method of utilizing product proxies with a dependency graph to avoid unnecessary computations after the graph has been changed.

2. Description of the Related Art

A dependency graph is a hierarchical set of nodes that describe a set of input data and computations which, when evaluated, produce output data that represents the state of the graph. One example of a dependency graph is a scene graph in computer graphics which, when evaluated, produces output data that represents the state of a 3D scene. A scene graph encodes, for example, the shape, location, and motion of the objects that appear in the 3D scene, or how these objects are illuminated by one or more virtual light sources.

FIG. 1 shows a diagram that illustrates an example of a prior-art dependency graph 100. As shown in FIG. 1, dependency graph 100 includes a number of hierarchically-ordered nodes 110. The nodes 110, which have a dependency relationship, include attribute nodes 110A and operator nodes 110P. In addition, a node 110 can have one or more input connectors 110N and one or more output connectors 110T.

Attribute nodes 110A contain the input data for the computations described by the dependency graph. An attribute node 110A stores and outputs a value that is typically input by a user. In a dependency graph that represents a scene in computer graphics, the value held by an attribute node 110A can represent, for example, the shape of a surface or the color of a light source. An operator node 110P, in turn, represents a computation that, when evaluated, transforms input data, such as the data received from an attribute node 110A or another operator node 110P, into output data known as products.

An operator node 110P receives its input data via the input connectors 110N, and it outputs its products via the output connectors 110T. In addition, an operator node 110P has a separate output connector 110T for each of its products. In some cases, attribute and operator nodes 110A and 110P may be combined, i.e., a single node 110 may represent a computation and at the same time store some of the input data required by the computation.

In the FIG. 1 example, an output connector 110T1 of an attribute node 110A1 and an output connector 110T2 of an attribute node 110A2 are connected to input connectors 110N1 and 110N2, respectively, of an operator node 110P1. When evaluated, attribute nodes 110A1 and 110A2 output first and second products D1 and D2 on output connectors 110T1 and 110T2, respectively, while operator node 110P1 outputs third and fourth products D3 and D4 on output connectors 110T3 and 110T4, respectively, computing the products from data received via input connectors 110N1 and 110N2.

In addition, an output connector 110T5 of an attribute node 110A3 and the output connector 110T4 of operator node 110P1 are connected to the input connectors 110N3 and 110N4, respectively, of an operator node 110P2. When evaluated, attribute node 110A3 outputs a fifth product D5 on output connector 110T5, while operator node 110P2 outputs a sixth product D6 on output connector 110T6, computing the product from data received via input connectors 110N3 and 110N4.

Further, output connector 110T3 of operator node 110P1 and output connector 110T6 of operator node 110P2 are connected to the input connectors 110N6 and 110N7, respectively, of an operator node 110P3. When evaluated, operator node 110P3 outputs a seventh product D7 on output connector 110T7, computing the product from data received via input connectors 110N6 and 110N7.

The computation performed by an operator node 110P can have any level of complexity, ranging from a trivial computation to an extremely complex computation. One example of a trivial computation is simply adding two numbers together to produce a product that is the sum of those numbers.

On the other hand, one example of a complex computation is a physical simulation that determines the motion paths of a number of colliding rigid bodies. In this example, the product that results from the computation might consist of the trajectories of the rigid bodies.

A dependency graph is constructed by creating and connecting attribute and operator nodes 110A and 110P to build up a set of input data and computations that describe the state of the graph. The computations, however, are performed only when the dependency graph is evaluated.

Once constructed, a dependency graph can be saved in a file for later evaluation. When a user wishes to obtain one or more of the products represented by the dependency graph, the dependency graph must be evaluated. (In this context, "user" can refer to either a person or to application software that queries the dependency graph.) Evaluation determines the desired products by traversing the dependency graph in a predetermined order, starting at the output connectors 110T that correspond to those products.

Evaluating a dependency graph does not require that all of the products in the graph be computed. Only the desired products, and the products that contribute to the desired products, need to be computed. The parts of the dependency graph that are unrelated to the products the user wants to obtain are not traversed at all.

In the FIG. 1 example, to determine the seventh product D7 of operator node 110P3, the values of the third product D3 and the sixth product D6 input to operator node 110P3 must be determined. To determine the value of product D6 output by operator node 110P2, the values of the fourth product D4 and the fifth product D5 must be determined.

To determine the value of products D3 and D4 output by operator node 110P1, the products D1 and D2 from attribute nodes 110A1 and 110A2, respectively, must be determined. In this way, evaluation traverses the scene graph, gathering input data from the attribute nodes 110A, and combining them to obtain the requested product.

It is a common practice to make changes to a dependency graph. In a computer graphics context, users commonly make changes to a 3D scene by making changes to the scene graph. For example, the values held by the attribute nodes 110A can be changed, nodes can be added or removed, and computations and connections between nodes can be changed.

When a dependency graph is changed in this way, the changes may cause one or more products from a previous evaluation of the dependency graph to be different from what one would get by evaluating the scene graph in its current state. In order to obtain new products that correspond to the changed dependency graph, the new dependency graph must be re-evaluated.

One approach to obtaining new products is to re-evaluate the dependency graph, starting at the output connectors 110T that correspond to products that the user has previously obtained. However, depending on the complexity of the computations performed by the operator nodes, re-evaluating a dependency graph to generate a product can be extremely time-consuming. Operations such as physical simulations can take many hours to complete.

Another approach to obtaining new products, which minimizes the time required to re-evaluate the dependency graph, is to save the products of the first evaluation and, after changing the dependency graph, determine which products are no longer valid as a result of the changes. After this, the invalid products are discarded. Thus, rather than discarding and re-computing all of the products every time the dependency graph is changed, only the products that may have changed as a result of the dependency graph changes are re-computed.

Determining which products become invalid when the dependency graph changes is typically done using a technique known as invalidation. With invalidation, when an attribute, an operator, or a connection is added or removed, or the value of an attribute is modified, the dependency graph is traversed, starting at the point where the change occurred, and following the connections from the output connectors 110T to the input connectors 110N, in the opposite direction as during evaluation.

When, during the traversal, an output connector 110T is encountered, for which a product has been saved, the product is marked as invalid. A product is invalid if it is not the same as what one would get by re-evaluating the scene graph in its current state. The remaining products, on the other hand, remain valid.

After invalidation, the dependency graph can be re-evaluated as before except that when a product from the first evaluation remains valid, it is re-used. As a result, as the dependency graph is traversed, only the products affected by the change are re-calculated, thereby significantly reducing the time required to re-evaluate the dependency graph.

One limitation of invalidation is that it typically does not work across sessions. When a session is terminated and a new session is started, all products are considered invalid at the beginning of the new session. Another limitation of invalidation is that if the dependency graph is changed, and then subsequently restored to its previous state, then the products associated with the restored part of the dependency graph are considered invalid.

A complex dependency graph is often broken up into multiple pieces that can be loaded and unloaded independently, so that multiple users can simultaneously work on different parts of the dependency graph. With invalidation, when a valid part of a dependency graph is unloaded and then subsequently reloaded, products that correspond to the reloaded part of the dependency graph can no longer be considered valid.

One problem which commonly arises when working with dependency graphs is that it is difficult to determine if products obtained by evaluating a dependency graph represent the current state of the dependency graph. In the context of computer graphics, where dependency graphs are employed to represent 3D scenes, this problem is particularly evident in larger animation studios where multiple groups of people are responsible for changing various parts of the dependency graph, and other groups are responsible for evaluating the dependency graph. Thus, there is a need for a method of utilizing a dependency graph that addresses these issues.

SUMMARY OF THE INVENTION

A method of utilizing a dependency graph is disclosed according to a first embodiment of the present invention. The dependency graph has a plurality of nodes. Each node has one or more output connectors, and each output connector has a product. In addition, one or more nodes have one or more input connectors.

In the present invention, the method determines whether a request for the product of an output connector of a selected node of the dependency graph has been received. Further, when a request has been received, the method determines whether a saved product and a saved product proxy for the output connector of the selected node exist. In addition, when the saved product and proxy exist, the method computes a new product proxy for the output connector of the selected node.

A machine-readable medium is disclosed according to a second embodiment of the present invention. The machine-readable medium has sequences of instructions stored thereon, the sequences of instructions including instructions which, when executed by a processor, cause the processor to determine whether a request for the product of an output connector of a selected node of the dependency graph has been received.

In addition, when a request has been received, the processor determines whether a saved product and a saved product proxy for the output connector of the selected node exist. In addition, when the saved product and proxy exist, the processor computes a new product proxy for the output connector of the selected node.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

As noted, FIGS. 2, 3, 4, and 5 are flow charts illustrating methods according to embodiments of the present invention. The techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

DETAILED DESCRIPTION OF THE INVENTION

When a dependency graph is changed, some products become invalid with respect to the new dependency graph, that is, re-evaluating the dependency graph after changing the dependency graph would produce different products. Other products remain valid, that is, re-evaluating the dependency graph after changing the dependency graph would produce the same products as before.

In many instances, evaluating a dependency graph is computationally expensive. Therefore, it is desirable to avoid unnecessary computations when a dependency graph is re-evaluated after a change. The present invention achieves this by re-using the products that remain valid.

When the original dependency graph is evaluated and traversal of the dependency graph encounters the output connector of an operator node whose product is considered computationally expensive, a first product proxy is determined for the product. In the present invention, the product proxy associated with a product can be a value determined in any way that has a very high probability of changing if the value of the product changes. After the first product proxy has been determined, the output connector's product and the first product proxy are saved, for example, in a file.

At a later time, when the dependency graph is re-evaluated, and traversal of the dependency graph encounters the output connector of an operator node for which a product and a first product proxy have been saved, a second product proxy for the output connector is determined.

The first and the second product proxies are then compared. If the first and the second product proxies are equal, then the saved product is still valid. In this case, it is not necessary to re-compute the output connector's product because the saved product can be used instead (i.e., remains valid).

On the other hand, if the first and second product proxies do not match, then the saved product is invalid. In this case, it is necessary to re-compute the output connector's product. Thus, by using a product proxy, the valid or invalid state of a product can be easily determined such that a dependency graph can be re-evaluated by re-computing only the products that have changed.

Figure 2:
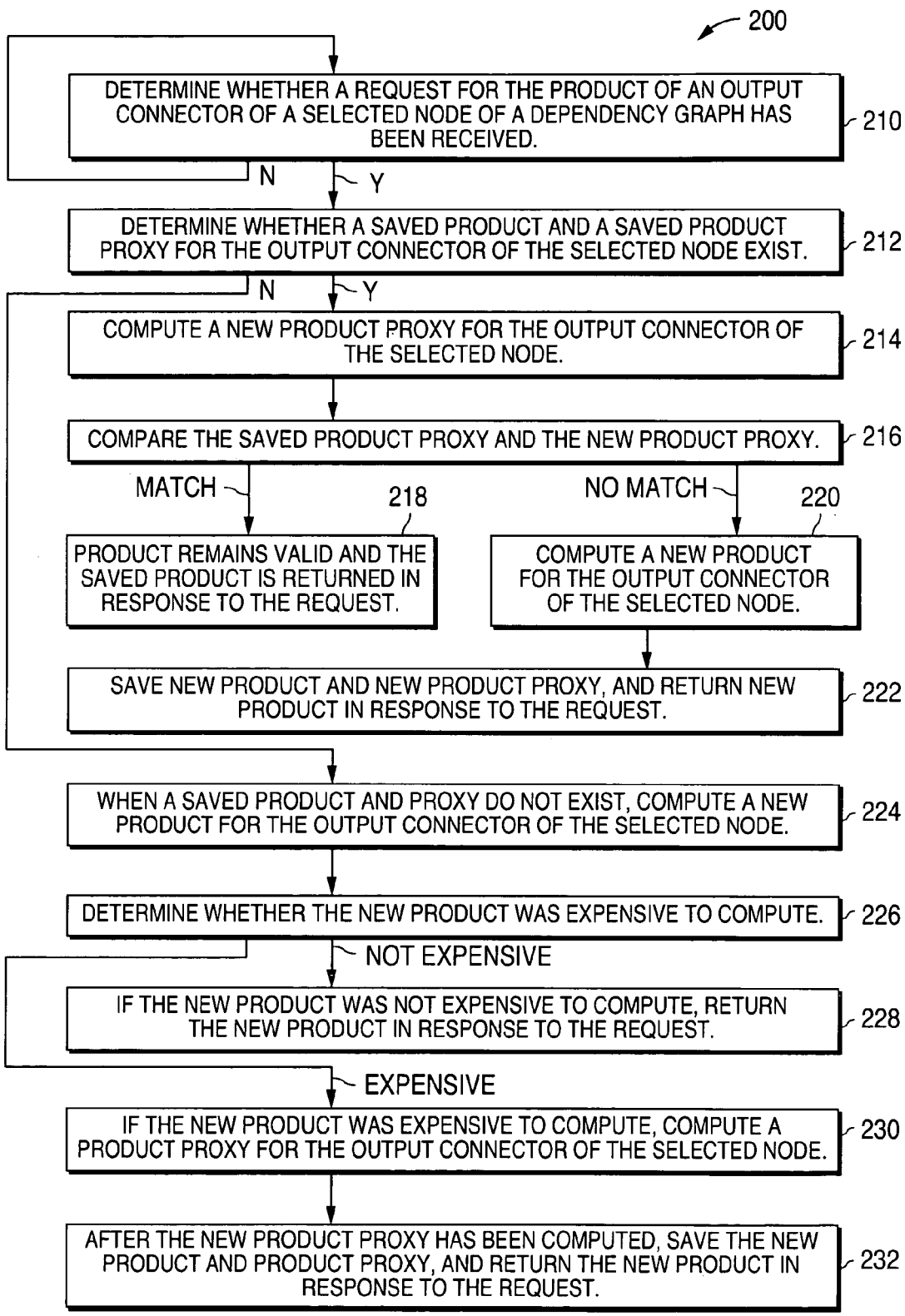
FIG. 2 is a flow chart that illustrates an example of a method 200 of evaluating a dependency graph in accordance with the present invention.

FIGS. 2-5 show flow charts that illustrate examples of methods that can operate together to re-evaluate a dependency graph in accordance with the present invention. FIG. 2 shows a flow chart that illustrates an example of a method 200 of evaluating a dependency graph in accordance with the present invention. The dependency graph used by the methods of the present invention has a number of attribute nodes and operator nodes, and can be implemented with a conventionally-formed dependency graph, such as dependency graph 100.

As shown in FIG. 2, method 200 determines in 210 whether a request for the product of an output connector of a selected node of a dependency graph has been received. When a request has been received, method 200 determines in 212 whether a saved product and a saved product proxy for the output connector of the selected node exist.

When the saved product and proxy exist, method 200 computes a new product proxy in 214 for the output connector of the selected node. After the new product proxy has been computed, method 200 compares the saved product proxy and the new product proxy in 216.

If the saved product proxy and the new product proxy are the same, then the product of the output connector of the selected node remains valid and method 200 returns the saved product in 218 in response to the request. On the other hand, if the saved proxy and the new product proxy are not the same, then the product of the output connector of the selected node is invalid and method 200 computes a new product for the output connector in 220. After this, method 200 saves the new product and new product proxy in 222, and returns the new product in response to the request.

As further shown in FIG. 2, when a saved product and proxy do not exist in 212, method 200 computes a new product in 224 for the output connector of the selected node. After the new product has been computed, method 200 determines in 226 whether the new product was expensive to compute.

If the new product was not expensive to compute, method 200 returns the new product in 228 in response to the request. On the other hand, if the new product was expensive to compute, method 200 computes a product proxy for the output connector of the selected node in 230. After the product proxy has been computed, method 200 saves the new product and product proxy in 232, and returns the new product in response to the request.

Figure 3:
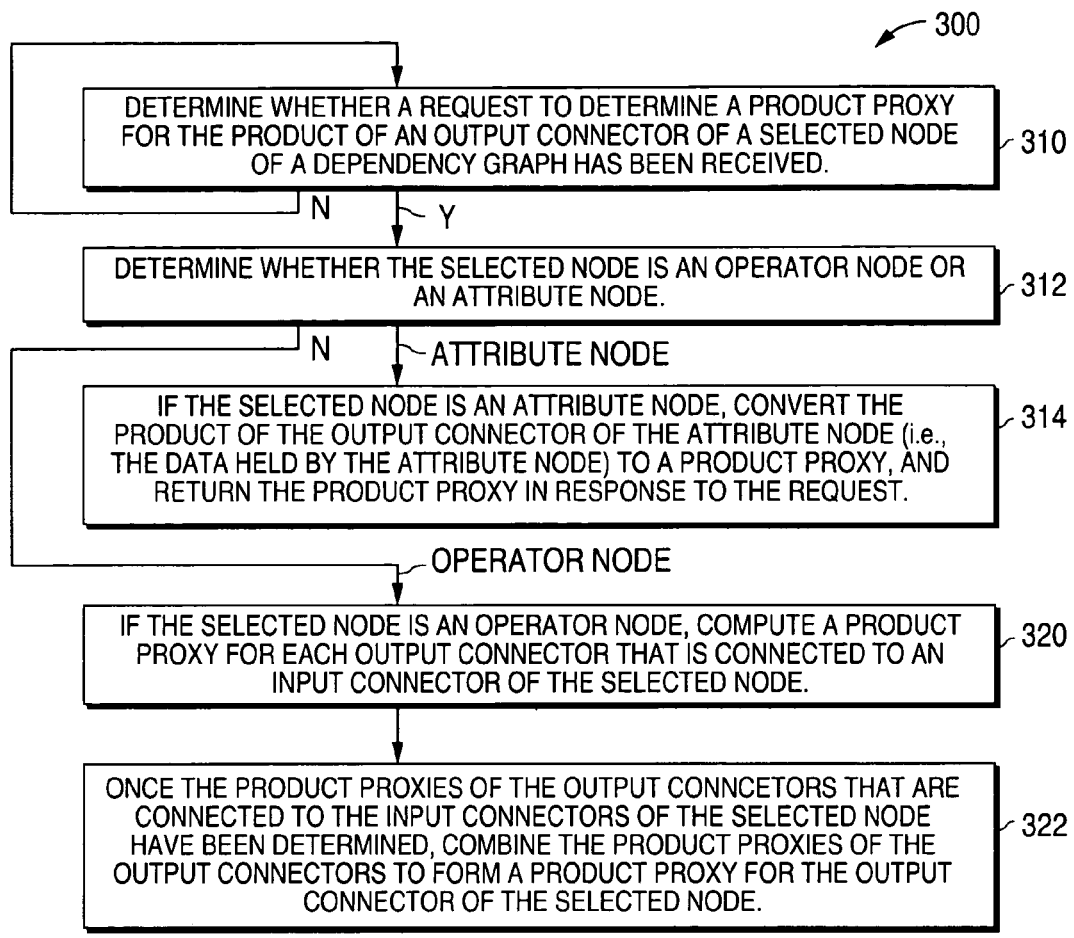
FIG. 3 is a flow chart illustrating an example of a method 300 of computing a product proxy in accordance with the present invention.

FIG. 3 shows a flow chart that illustrates an example of a method 300 of computing a product proxy in accordance with the present invention. As shown in FIG. 3, method 300, which can implement 214 in FIG. 2, determines in 310 whether a request to determine a product proxy for the product of an output connector of a selected node of a dependency graph has been received.

When a request has been received, method 300 determines in 312 whether the selected node is an operator node or an attribute node. If the selected node is an attribute node, in 314, method 300 converts the product of the output connector of the attribute node (i.e., the data held by the attribute node) to a product proxy, and returns the product proxy in response to the request.

Alternatively, any unique data that is associated with the current data held by the attribute node can be converted into a product proxy. For example, a time stamp, which indicates the date and time that the data held by the attribute node was last changed, can be used. Thus, if the data held by the attribute node is large, representing, for example, a surface with millions of control points, then the time stamp of the attribute node can be used rather than the data. Using a time stamp rather than a large amount of data significantly reduces the processing time required to generate the product proxy.

Method 300 can convert the product of the output connector of the attribute node into a product proxy by, for example, inputting the product into a hashing algorithm. In the present example, the number of bits that represent the value input to the algorithm can be arbitrarily large, and the algorithm can convert an arbitrary amount of input data into a fixed-size code. The algorithm can be implemented with, for example, a cryptographic hash function like MD4, MD5, or SHA-256, where each bit in the hash code produced by the hash function changes with probability 0.5 when the input changes.

The product proxy for an output connector typically contains a fixed number of bits, but the number of bits that represent the product for the output connector can be arbitrarily large. Cryptographic hash functions typically output a fixed number of bits (this is true for MD4, MD5 and SHA-256), but variable-size product proxies can also be used. Therefore, there may be more possible values for the product than there are values for the product proxy. As a result, an error can potentially arise where changes to the dependency graph cause a product to change without causing the corresponding product proxy to change.

However, by picking a large enough number of bits for the product proxy, the probability of an error occurring can be set arbitrarily close to zero. (As close to zero as necessary, not close to an arbitrary value such as zero.) For example, a 256-bit product proxy provides less likelihood of an error than a 128-bit product proxy. Thus, a product proxy in the present invention has a very high probability of changing when the value of the product changes when data held by the attribute node is entered into the hashing algorithm.

On the other hand, if in 312, the selected node is not an attribute node, but is an operator node, then in 320 method 300 computes a product proxy for each output connector that is connected to an input connector of the selected node. In the present example, method 300 computes a product proxy in 320 by again utilizing method 300. The result of this, as further illustrated in the example below, is to create a nesting effect that works back up the dependency graph until the output connector of an attribute node is reached.

Once the product proxies of the output connectors that are connected to the input connectors of the selected node have been determined, method 300 combines the product proxies of the output connectors that are connected to the input connectors of the selected node in 322 to form a product proxy for the output connector of the selected node.

Figure 4:
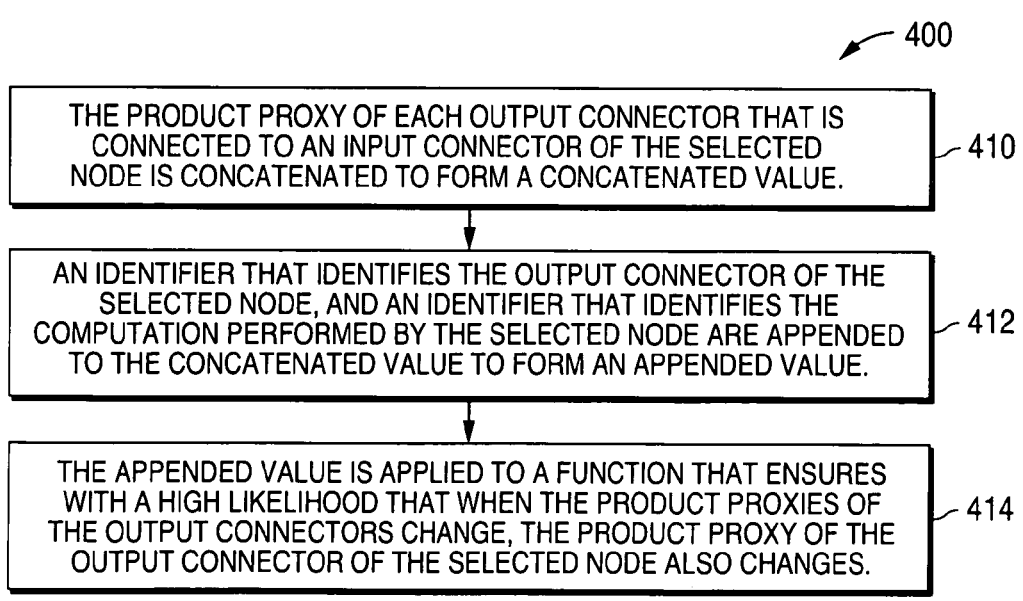
FIG. 4 is a flow chart illustrating an example of a method 400 of combining the product proxy of the output connectors in accordance with the present invention.

FIG. 4 shows a flow chart that illustrates an example of a method 400 of combining the product proxy of the output connectors in accordance with the present invention. As shown in FIG. 4, method 400, which can implement 322 in FIG. 3, begins at 410 where the product proxy of each output connector that is connected to an input connector of the selected node is concatenated to form a concatenated value.

In the present example, method 400 appends in 412 an identifier that identifies the computation performed by the selected node, and an identifier that identifies the output connector of the selected node to form an appended value. Output connectors can be identified by names or numbers, or by any other bit of information that is unique among an operator's outputs. The computation type, in turn, represents the type of computation performed by the operator node. The type of computation performed by the operator can be identified by the name of the program subroutine or object class that implements the computation.

Following this, in 414, method 400 applies the appended value to a function that ensures with a high likelihood that when the product proxies of the output connectors that are connected to the input connectors of the selected node change, the product proxy of the output connector of the selected node changes. The appended value can be input to the cryptographic hash function, like MD4, MD5, or SHA-256, to output the product proxy of the output connector of the selected node as, for example, a 128-bit or 256-bit value.

Thus, the product proxy of a first output connector of a first operator node, which depends on the product proxy of a set of second output connectors that are connected to the input connectors of the first operator node, can be determined by forming an appended value, and entering the appended value into the hashing algorithm to compute the proxy product for the output connector of the first operator node.

Figure 5:
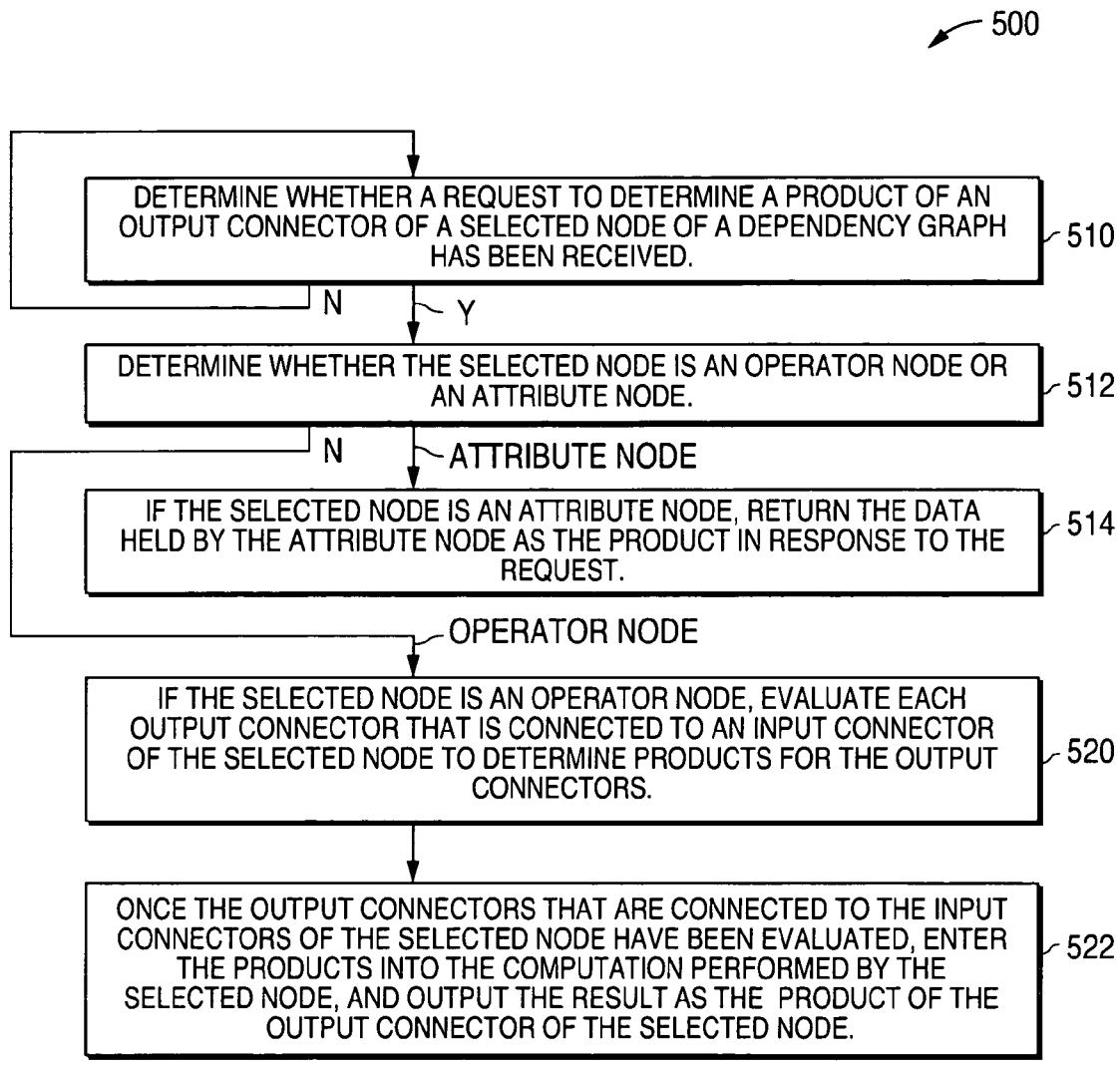
FIG. 5 is a flow chart illustrating an example of a method 500 of computing a new product in accordance with the present invention.

FIG. 5 shows a flow chart that illustrates an example of a method 500 of computing a new product in accordance with the present invention. As shown in FIG. 5, method 500, which can implement 220 and 224 of FIG. 2, determines in 510 whether a request to determine a new product of an output connector of a selected node of a dependency graph has been received.

When a request has been received, method 500 determines in 512 whether the selected node is an operator node or an attribute node. If the selected node is an attribute node, in 514, method 500 returns the data held by the attribute node as the new product in response to the request.

On the other hand, if in 512 the selected node is not an attribute node, but is an operator node, then in 520, method 500 evaluates each output connector that is connected to an input connector of the selected node to determine products for the output connectors. Once the output connectors that are connected to the input connectors of the selected node have been evaluated, method 500 enters the products into the computation performed by the selected node in 522, and outputs the result as the product of the output connector of the selected node.

In the present example, method 500 evaluates an output connector in 520 by again utilizing method 200. The result of this, as further illustrated in the example below, is to create a nesting effect that works back up the dependency graph until the output connector of an attribute node or the output connector of an operator node with a matching product proxy is reached.

Figure 1:
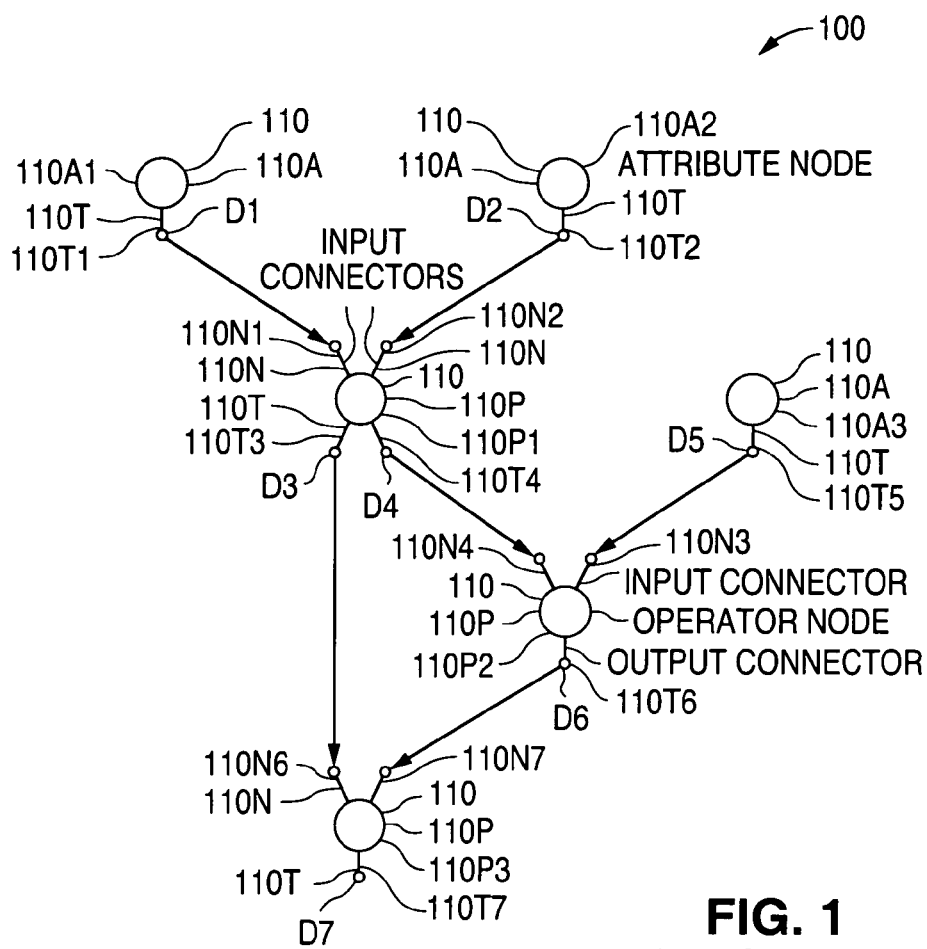
FIG. 1 is a diagram illustrating an example of a prior-art dependency graph 100.

The operation of the present invention is described with respect to dependency graph 100 shown in FIG. 1. In the present example, operation begins with method 200 in 210 when a request for a product, such as the product of output connector 110T4 of selected node 110P1, has been received. In addition, in the present example, assume that method 200 determines in 212 that a saved product and a saved product proxy for output connector 110T4 of selected node 110P1 exist.

In this case, method 200 determines a new product proxy in 214 by invoking method 300 for the first time, which detects the request in 310. In 312, method 300 detects that selected node 110P1 is an operator node. Following this, in 320, method 300 computes product proxies for the output connectors 110T1 and 110T2 that are connected to the input connectors 110N1 and 110N2 of selected node 110P1.

To compute the product proxy for output connector 110T1 of node 110A1, method 300 invokes method 300 for a second time. The request is detected in 310, and node 110A1 is determined to be an attribute node in 312. As a result, in 314, method 300 converts the product of output connector 110T1 of attribute node 110A1 (i.e., the data held by attribute node 110A1) to a product proxy, such as by inputting the data held by attribute node 110A1 to the hash function, and returns the product proxy for output connector 110T1 in response to the request, thereby ending the second use of method 300. Control then returns to 320 of the first use of method 300 to compute the product proxy for output connector 110T2.

To compute the product proxy for output connector 110T2 of node 110A2, method 300 invokes method 300 for a third time. The request is detected in 310, and node 110A2 is determined to be an attribute node in 312. As a result, in 314, method 300 converts the product of output connector 110T2 of attribute node 110A2 (i.e., the data held by attribute node 110A2) to a product proxy, such as by inputting the data held by attribute node 110A2 to the hash function, and returns the product proxy for output connector 110T2 in response to the request, thereby ending the third use of method 300.

At this point, control returns to 322 of the first use of method 300 as the second and third invocations of method 300 have determined the product proxies of the output connectors that are connected to the input connectors of the selected node as required by 320. In 322, method 300 combines the product proxies of the output connectors 110T1 and 110T2 to form a product proxy for output connector 110T4 of node 110P1. For example, the product proxies of output connectors 110T1 and 110T2 can be concatenated, appended with identification codes, and entered into the hash function to generate a fixed-length product proxy for output connector 110T4 of node 110P1.

Once the new product proxy for output connector 110T4 has been determined, the first use of method 300 ends, and control returns to method 200. Method 200 then compares the saved product proxy and the new product proxy in 216. If the saved product proxy and the new product proxy are the same, then the product of output connector 110T4 remains valid and method 200 returns the saved product in 218 in response to the request. On the other hand, if the saved proxy and the new product proxy are not the same, then the product of output connector 110T4 is invalid and method 200 computes a new product in 220, and outputs the new product in 222 in response to the request.

Method 200 computes a new product in 220 by invoking method 500 for the first time, which detects the request in 510. In 512, method 500 detects that node 110P1 is an operator node. Following this, in 520, method 500 evaluates each output connector that is connected to an input connector of selected node 110P1 to determine products for the output connectors.

Method 500 evaluates each output connector in 520 by invoking method 200. Thus, output connector 110T1 is evaluated by invoking method 200 for a second time, which detects the request in 210. In 212, method 200 determines that a saved product and product proxy do not exist. In 224, method 200 invokes method 500 for the second time to determine a new product for output connector 110T1, which is detected in 510.

When a request has been received, method 500 determines in 512 that node 110A1 is an attribute node. As a result, in 514, method 500 returns the data held by the attribute node as the product in response to the request, ending the second use of method 500. Control then returns to method 200 to 226 to determine whether the new product was expensive to compute. The product of an attribute node is not typically expensive to compute. As a result, method 200 moves to 228 to output the product, ending the second use of method 200. Following this, control returns to 520 of the first use of method 500 to evaluate output connector 110T2.

Output connector 110T2 is evaluated by invoking method 200 for a third time, which detects the request in 210. In 212, method 200 determines that a saved product and product proxy do not exist. In 224, method 200 invokes method 500 for the third time to determine a new product for output connector 110T2, which is detected in 510.

When a request has been received, method 500 determines in 512 that node 110A2 is an attribute node. As a result, in 514, method 500 returns the data held by the attribute node as the product in response to the request, ending the third use of method 500. Control then returns to method 200 to 226 to determine whether the new product was expensive to compute, and then to 228 to output the product, ending the third use of method 200. Following this, control returns to 522 of the first use of method 500 to enter the products into the computation performed by the selected node. Control then returns to 222 of the first use of method 200.

One of the advantages of the present invention is that the present invention can quickly determine whether a product obtained from a dependency graph, such as a rendered image in a scene graph, continues to represent the dependency graph. For example, assume that a first person evaluates a scene graph to obtain a product that is an image.

The first person departs and a second person arrives. The second person changes the scene graph, and then departs. When the first person again returns, the first person can easily tell whether or not the image that was previously rendered continues to represent the scene graph with the methods of the present invention.

When the image's first product proxy and second product proxy match, the image previously rendered continues to represent the scene graph. On the other hand, when the product proxies fail to match, the image may no longer represent the scene graph. As a result, the output connector whose product is the image must be re-evaluated to ensure an accurate product. Thus, the present invention allows the final set of pixels in the rendered image to be tied to the scene graph that was used to produce it.

Another advantage of the present invention is that the present invention can be used to identify the products that may have changed as a result of a change to the dependency graph. When a first product proxy of an output connector and the corresponding second product proxy fail to match, the product of the output connector may have changed. As a result, the operator node must be re-evaluated to ensure that the product is accurate.

In addition, unlike invalidation, the products are not unnecessarily marked as invalid when a complex scene graph is broken up into multiple pieces that can be loaded and unloaded independently. Thus, portions of the scene graph which are not being worked on can be removed and subsequently re-loaded without causing products that depend on the removed portions to be labeled as invalid.

Figure 6:
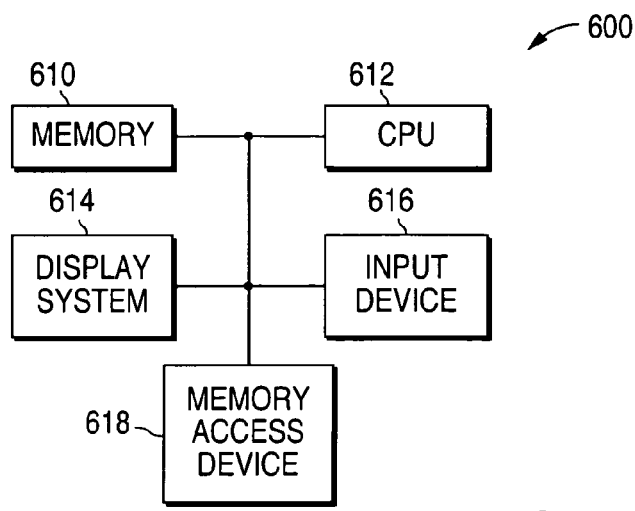
FIG. 6 is a block diagram illustrating an example of a computer 600 in accordance with the present invention.

FIG. 6 shows a block diagram that illustrates an example of a computer 600 in accordance with the present invention. Computer 600, which can be implemented with, for example, a Pentium4 3.4 GHz or comparable machine, or a number of networked machines, can be used to execute a sequence of instructions that implements methods 200, 300, 400, and 500 of the present invention.

As shown in FIG. 6, computer 600 includes a memory 610 and a central processing unit (CPU) 612 that is connected to memory 610. Memory 610 stores data, an operating system, and a set of program instructions. The operating system can be implemented with, for example, the Linux operating system, although other operating systems can alternately be used. The program instructions can be written in, for example, C++ although other languages can alternately be used.

CPU 612, which can be implemented with, for example, a 32-bit processor, operates on the data in response to the program instructions. Although only one processor is described, the present invention can be implemented with multiple processors in parallel to increase the capacity to process large amounts of data.

In addition, computer 600 has an input/output system that inputs commands to CPU 610, and program instructions and data to memory 612, and outputs processed data from CPU 610 and/or memory 612. For example, the input/output system can include a display system 614 that is connected to CPU 612. Display system 614, which can be remotely located, allows images to be displayed to the user which are necessary for the user to interact with CPU 612. The input/output system can also include a user-input system 616 which is connected to CPU 612. Input system 616, which can be remotely located, allows the user to interact with the CPU 612.

Further, the input/output system can include an access device 618, such as a networking card, which is connected to memory 610 and CPU 612. Access device 618 allows the processed data from memory 610 or CPU 612 to be transferred to a computer-readable medium or a networked computer. In addition, device 618 allows the program instructions to be transferred to memory 610 from the computer-readable medium or networked computer.

In an alternative embodiment, hardware circuitry may be used in place of or in combination with software instructions to implement an embodiment of the present invention. As a result, the present invention is not limited to any specific combination of hardware circuitry and software.

Embodiments of the present invention may be provided as a computer program product, or software, that may include an article of manufacture on a machine accessible or machine readable medium having instructions. The instructions on the machine accessible or machine readable medium may be used to program a computer system or other electronic device.

The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment.

The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of utilizing a dependency graph, the dependency graph having a plurality of nodes, each node having one or more output connectors, each output connector having a product, one or more nodes having one or more input connectors, the method comprising:
   determining whether a request for the product of an output connector of a selected node of the dependency graph has been received;
   when a request has been received, determining whether a saved product and a saved product proxy for the output connector of the selected node exist; and
   when the saved product and proxy exist, computing a new product proxy for the output connector of the selected node.

2. The method of claim 1 and further comprising, after the new product proxy has been computed, comparing the saved product proxy and the new product proxy.

3. The method of claim 2 and further comprising, if the saved product proxy and the new product proxy are equal, returning the saved product in response to the request.

4. The method of claim 3 and further comprising:
   if the saved proxy and the new product proxy are not equal, computing a new product for the output connector of the selected node; and
   saving the new product and the new product proxy, and returning the new product in response to the request.

5. The method of claim 1 wherein computing a new product proxy comprises:
   determining whether a request to determine a product proxy for the product of the output connector of the selected node of the dependency graph has been received;
   when a request has been received, determining whether the selected node is an operator node or an attribute node; and
   if the selected node is an attribute node, converting the product of the output connector of the attribute node to a product proxy, and returning the product proxy in response to the request.

6. The method of claim 5 wherein computing a new product proxy further comprises:
   if the selected node is an operator node, computing a product proxy for each output connector that is connected to an input connector of the selected node; and
   once the product proxies of the output connectors that are connected to the input connectors of the selected node have been determined, combining the product proxies of the output connectors that are connected to the input connectors of the selected node to form a product proxy for the output connector of the selected node.

7. The method of claim 6 wherein combining the product proxies comprises:
   concatenating the product proxy of each output connector that is connected to an input connector of the selected node to form a concatenated value;
   appending an identifier that identifies a computation performed by the selected node, and an identifier that identifies the output connector of the selected node to form an appended value; and
   applying the appended value to a function that ensures with a high likelihood that when the product proxies of the output connectors that are connected to the input connectors of the selected node change, the product proxy of the output connector of the selected node changes.

8. The method of claim 7 wherein the function is a cryptographic hash function.

9. The method of claim 4 wherein computing a new product comprises:
   determining whether a request to determine a new product of the output connector of the selected node of the dependency graph has been received;
   when a request has been received, determining whether the selected node is an operator node or an attribute node; and
   if the selected node is an attribute node, returning the data held by the attribute node as the new product.

10. The method of claim 9 wherein computing a new product additionally comprises:
    if the selected node is an operator node, evaluating each output connector that is connected to an input connector of the selected node to determine products for the output connectors that are connected to the input connectors of the selected node; and
    once the output connectors that are connected to the input connectors of the selected node have been evaluated, entering the products into a computation performed by the selected node, and outputting the result of the computation as the product of the output connector of the selected node.

11. A machine-readable medium having stored thereon sequences of instructions, the sequences of instructions including instructions which, when executed by a processor, cause the processor to perform:
    determining whether a request for the product of an output connector of a selected node of the dependency graph has been received;
    when a request has been received, determining whether a saved product and a saved product proxy for the output connector of the selected node exist; and
    when the saved product and proxy exist, computing a new product proxy for the output connector of the selected node.

12. The machine-readable medium of claim 11 wherein the processor further performs, after the new product proxy has been computed, comparing the saved product proxy and the new product proxy.

13. The machine-readable medium of claim 12 wherein the processor further performs, if the saved product proxy and the new product proxy are equal, returning the saved product in response to the request.

14. The machine-readable medium of claim 13 wherein the processor further performs:
- if the saved proxy and the new product proxy are not equal, computing a new product for the output connector of the selected node; and
- saving the new product and the new product proxy, and returning the new product in response to the request.

15. The machine-readable medium of claim 11 wherein computing a new product proxy comprises:
- determining whether a request to determine a product proxy for the product of the output connector of the selected node of the dependency graph has been received;
- when a request has been received, determining whether the selected node is an operator node or an attribute node; and
- if the selected node is an attribute node, converting the product of the output connector of the attribute node to a product proxy, and returning the product proxy in response to the request.

16. The machine-readable medium of claim 15 wherein computing a new product proxy further comprises:
- if the selected node is an operator node, computing a product proxy for each output connector that is connected to an input connector of the selected node; and
- once the product proxies of the output connectors that are connected to the input connectors of the selected node have been determined, combining the product proxies of the output connectors that are connected to the input connectors of the selected node to form a product proxy for the output connector of the selected node.

17. The machine-readable medium of claim 16 wherein combining the product proxies comprises:
- concatenating the product proxy of each output connector that is connected to an input connector of the selected node to form a concatenated value;
- appending an identifier that identifies a computation performed by the selected node, and an identifier that identifies the output connector of the selected node to form an appended value; and
- applying the appended value to a function that ensures with a high likelihood that when the product proxies of the output connectors that are connected to the input connectors of the selected node change, the product proxy of the output connector of the selected node changes.

18. The machine-readable medium of claim 17 wherein the function is a cryptographic hash function.

19. The machine-readable medium of claim 14 wherein computing a new product comprises:
- determining whether a request to determine a new product of the output connector of the selected node of the dependency graph has been received;
- when a request has been received, determining whether the selected node is an operator node or an attribute node; and
- if the selected node is an attribute node, returning the data held by the attribute node as the new product.

20. The machine-readable medium of claim 19 wherein computing a new product additionally comprises:
- if the selected node is an operator node, evaluating each output connector that is connected to an input connector of the selected node to determine products for the output connectors that are connected to the input connectors of the selected node; and
- once the output connectors that are connected to the input connectors of the selected node have been evaluated, entering the products into a computation performed by the selected node, and outputting the result of the computation as the product of the output connector of the selected node.

* * * * *